United States Patent
Creamer et al.

(10) Patent No.: US 8,204,181 B2
(45) Date of Patent: *Jun. 19, 2012

(54) TELECOMMUNICATIONS VOICE SERVER LEVERAGING APPLICATION WEB-SERVER CAPABILITIES

(75) Inventors: Thomas E. Creamer, Boca Raton, FL (US); Victor S. Moore, Lake City, FL (US); Wendi L. Nusbickel, Boca Raton, FL (US); Ricardo Dos Santos, Boca Raton, FL (US); James J. Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 1019 days.

This patent is subject to a terminal disclaimer.

(21) Appl. No.: 12/166,824

(22) Filed: Jul. 2, 2008

(65) Prior Publication Data

US 2008/0267370 A1    Oct. 30, 2008

Related U.S. Application Data

(63) Continuation of application No. 10/833,525, filed on Apr. 28, 2004, now Pat. No. 7,412,038.

(51) Int. Cl.
 H04M 3/42 (2006.01)
 H04M 11/00 (2006.01)
 H04L 12/16 (2006.01)
 G10L 11/00 (2006.01)

(52) U.S. Cl. ............ 379/88.13; 370/260; 370/352; 370/400; 379/88.04; 379/88.22; 379/93.01; 379/211.01; 379/221.08; 434/118; 455/426.1; 704/270.1; 704/243; 709/223; 709/230; 719/310; 719/311; 719/314

(58) Field of Classification Search ........... 379/88.13, 379/88.14, 88.17, 88.22, 93.01, 211.01, 221.08, 379/88.04; 704/270.1, 270, 260, 243; 709/230, 709/227, 223; 719/310, 311, 314; 370/338, 370/260, 352, 400; 455/414.1, 517, 426.1; 434/118

See application file for complete search history.

(56) References Cited

U.S. PATENT DOCUMENTS

| | | | | |
|---|---|---|---|---|
| 5,664,058 A * | 9/1997 | Vysotsky | ............... | 704/243 |
| 6,196,846 B1 * | 3/2001 | Berger et al. | ............... | 434/118 |
| 6,272,126 B1 * | 8/2001 | Strauss et al. | ............... | 370/352 |
| 6,304,572 B1 * | 10/2001 | Christie | ............... | 370/400 |
| 6,396,907 B1 * | 5/2002 | Didcock | ............... | 379/88.17 |
| 6,501,832 B1 * | 12/2002 | Saylor et al. | ............... | 379/88.04 |
| 6,522,645 B1 * | 2/2003 | Lee et al. | ............... | 370/352 |
| 6,553,427 B1 * | 4/2003 | Chang et al. | ............... | 719/314 |
| 6,574,661 B1 * | 6/2003 | Delano et al. | ............... | 709/223 |
| 6,584,076 B1 * | 6/2003 | Aravamudan et al. | ...... | 370/260 |

(Continued)

Primary Examiner — Gerald Gauthier
(74) Attorney, Agent, or Firm — Wolf, Greenfield & Sacks, P.C.

(57) ABSTRACT

A method for providing voice telephony services can include the step of receiving a call via a telephone gateway. The telephone gateway can convey call identifying data to a resource connector. A media port can be responsively established within a media converter that is communicatively linked to the telephone gateway through a port associated with the call. A call description object can be constructed that includes the call identifying data and an identifier for the media port. The call description object can be conveyed to a telephony application server that provides at least one speech service for the call. The telephony application server can initiate at least one programmatic action of a communicatively linked speech engine. The speech engine can convey results of the programmatic action to the media converter through the media port. The media converter can stream speech signals for the call based upon the results.

11 Claims, 2 Drawing Sheets

U.S. PATENT DOCUMENTS

| | | | |
|---|---|---|---|
| 6,741,678 B2 * | 5/2004 | Cannell et al. | 379/88.14 |
| 6,801,604 B2 * | 10/2004 | Maes et al. | 379/88.17 |
| 6,876,644 B1 * | 4/2005 | Hsu et al. | 370/338 |
| 7,039,434 B1 * | 5/2006 | Matsumoto | 455/517 |
| 7,099,442 B2 * | 8/2006 | Da Palma et al. | 379/88.22 |
| 7,103,156 B2 * | 9/2006 | Celi et al. | 379/88.14 |
| 7,184,534 B2 * | 2/2007 | Birch et al. | 379/211.01 |
| 7,212,623 B2 * | 5/2007 | Creamer et | 379/221.08 |
| 7,412,038 B2 * | 8/2008 | Creamer et al. | 379/88.13 |
| 7,424,432 B2 * | 9/2008 | Creamer et al. | 704/270.1 |
| 7,448,041 B2 * | 11/2008 | Creamer et al. | 719/311 |
| 7,548,858 B2 * | 6/2009 | Wang | 704/260 |
| 7,552,225 B2 * | 6/2009 | Creamer et al. | 709/230 |
| 7,751,535 B2 * | 7/2010 | Creamer et al. | 379/88.17 |
| 7,839,983 B2 * | 11/2010 | Creamer et al. | 379/88.13 |
| 2001/0043684 A1 * | 11/2001 | Guedalia et al. | 379/88.17 |
| 2002/0160757 A1 * | 10/2002 | Shavit et al. | 455/414 |
| 2002/0181672 A1 * | 12/2002 | Cannell et al. | 379/88.14 |
| 2003/0125023 A1 * | 7/2003 | Fishler | 455/426 |
| 2005/0246173 A1 * | 11/2005 | Creamer et al. | 704/270 |
| 2005/0246175 A1 * | 11/2005 | Creamer et al. | 704/270.1 |
| 2008/0086564 A1 * | 4/2008 | Putman et al. | 709/227 |
| 2009/0055191 A1 * | 2/2009 | Creamer et al. | 704/270.1 |
| 2009/0059818 A1 | 3/2009 | Pickett | |

* cited by examiner

TELECOMMUNICATIONS VOICE SERVER LEVERAGING APPLICATION WEB-SERVER CAPABILITIES

CROSS REFERENCE TO RELATED APPLICATIONS

This application is a continuation of, and accordingly claims the benefit from, U.S. patent application Ser. No. 10/833,525, now issued U.S. Pat. No. 7,412,038, which was filed in the U.S. Patent and Trademark Office on Apr. 28, 2004.

BACKGROUND

1. Field of the Invention

The present invention relates to the field of telecommunications and, more particularly, to a telecommunications voice server.

2. Description of the Related Art

The information age has heralded advancements in data accessibility that alter the manner in which people interact socially and economically. Information tools like personal data assistances (PDA's), Web-enabled mobile telephones, computers, vehicle navigation systems, and the like can immerse users in pools of information designed to avoid inconveniences and to generally ease hardships inherent in hectic lifestyles. For example, information tools can help users avoid traffic, maintain social contacts, receive important business email when away from the office, and the like. A key component of the technological infrastructure providing these capabilities includes voice server systems which provide a multitude of speech services, like automatic speech recognition services, synthetic speech. generation services, transcription services, language and idiom translation services, and the like.

Implementing robust voice servers, in an extensible, cost efficient manner has been a daunting challenge to service providers. Speech technologies are constantly changing and can require vast hardware and software resources. For example, natural sounding speech generation is commonly performed by concatentative text-to-speech (CTTS) engines, even though hundreds of megabytes of information can be required for storing the phonemes associated with a single CTTS voice, and even though significant processing resources can be involved in constructing synthetic speech from these phonemes. Providing other speech services provides similar challenges. For example, natural language interpretation within ASR engines can require vast neural networks to interpret speech input with reasonable accuracy.

As if these complexities were not enough, telecommunication protocols, call management services, and telephony features must be managed by a voice server that provides speech services for telephony communications. That is, conventional voice server systems include call session management features, remote access capabilities, lifecycle management, load distribution, and other telephony related features that are typically handled internally for performance reasons. Performance of a voice server can be significant because voice services are often required for real time and near-real time tasks making appreciable processing delays problematic. It would be highly advantageous, if telecommunication related features of existing telecommunication application servers could be leveraged by voice server systems so that these features need not be separately implemented within voice-server systems.

SUMMARY OF THE INVENTION

The present invention provides a complete telecommunications voice server that provides telephony, speech processing, and application services via a standard language using a service browser. The voice server described herein leverages capabilities that exist within an application server, such as the Websphere Application Server (WAS) from International Business Machines, Inc. of Armonk, N.Y. Notably, the present invention utilizes an existing product base when implementing the voice server minimizes code development and maintenance cost while maximizing functionality.

For example, when integrated with the WAS, the disclosed voice server need not separately implement session management, lifecycle management, remote access, error tracking, pooling, and similar functionality. Since each of these capabilities have been optimized for the WAS, the runtime performance and resource efficiency of the disclosed voice server is high. Moreover when integrated with the WAS, the disclosed voice server system can utilize software objects and libraries, such as Java(™) 2 Platform, Enterprise Edition (J2EE), developed for and utilized by the WAS, further minimizing development and maintenance costs, while providing a platform independent, scalable, and extensible solution.

One aspect of the present invention can include a method for providing voice telephony services. The method can include the step of receiving a call via a telephone gateway. The telephone gateway can convey call identifying data to a resource connector. A media port can be responsively established within a media converter that is communicatively linked to the telephone gateway through a port associated with the call. A call description object (CDO) can be constructed that includes the call identifying data and an identifier for the media port. The CDO can be conveyed to a telephony application server that provides at least one speech service for the call. The telephony application server can initiate at least one programmatic action of a communicatively linked speech engine. The speech engine can convey results of the programmatic action to the media converter through the media port. The media converter can stream speech signals for the call based upon the results.

Another aspect of the present invention can include a telephony system with speech capabilities. The system can include a telephony gateway, a telephone application server, a resource connector, and a media converter. The telephony gateway can be communicatively linked to a telephone network, such as a public switched telephone network (PSTN). The telephone application server can provide at least one speech service. In one embodiment, the telephone application server can include a WAS. The resource connector can be a communication intermediary between the telephone gateway and the telephone application server, where call information can be gathered by the resource connector and conveyed to the telephone application server. The media converter can be a communication intermediary between the telephone gateway and the application server, where speech signals can be streamed between the telephone gateway and at least one speech engine.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
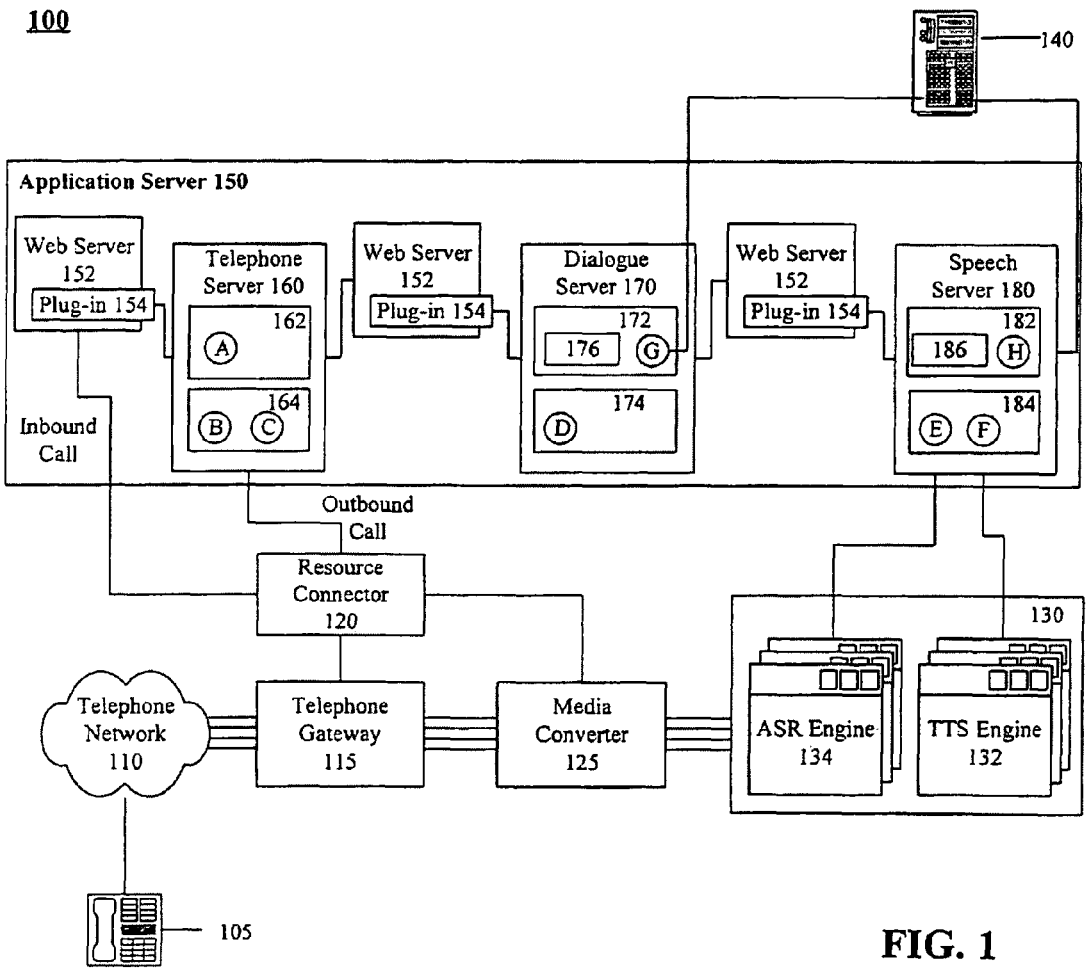
FIG. 1 is a schematic diagram illustrating a telecommunication application server providing speech services in accordance with the inventive arrangements disclosed herein.

FIG. 1 is a schematic diagram illustrating a telephony system 100 in accordance with the inventive arrangements disclosed herein. The system 100 can include a telephone gateway 115, a telephony application server 150, and a multitude of speech engines 130. The telephone gateway 115 can include hardware or software that translates protocols and/or routes calls between a telephone network 110 and the application sever 150. For example, the telephone gateway 115 can include a Cisco 2600 series router from Cisco Systems, Inc. of San Jose, Calif., a Cisco, a Cisco 5300 series gateway, a Digital Trunk eXtended Adapter (DTXA), a Intel (R) Dialogic (R) Adaptor from Intel Corporation of Santa Clara, Calif., and the like. The speech engines 130 can include one or more automatic speech recognition engines 134, one or more text to speech engines 132, and other speech related engines and/or services.

The application server 150 can include an engine that functions as a reliable foundation for handling high volume secure transactions and Web services. In one embodiment, the application server 150 can be a Websphere Application Server (WAS).

The application server 150 can also include a multitude of component servers, such as telephone server 160, dialogue server 170, and speech server 180, communicatively linked via a multitude of Web servers 152. Each Web server 152 can include one or more plug-ins 154, where each plug-in 154 can include routines for conveying data to particular component servers within the application server 150. Each of the component servers of the application server 150 can be implemented as Virtual Machines, such as virtual machines adhering to the Java 2 Enterprise Edition (J2EE) specification.

In one arrangement, component servers of the application server 150 can also be distributed across a network. In such an arrangement, data can be conveyed to each of the component servers via the Web servers 152. The Web servers 152 can utilize Hypertext Transfer Protocol. Format (HTTP) for compatibility with IP sprayers and firewalls. The invention, however, is not limited in this regard and other data conveyance protocols can be used. For example, file transfer protocol (FTP) can be used to convey data between component servers.

The component servers within the application server 150 can include a telephone server 160, a dialogue server 170, and a speech server 180. The telephone server 160 can control the setup, monitoring, and tear down of phone calls. In one arrangement, telephone server 160 can include a web container 162 and an Enterprise Java Beans (EJB) container 164. Moreover, the telephone server 160 can include a call control servlet (servlet A), a call control EJB (Bean B), and a call control interpreter EJB (Bean C).

The dialogue server 170 can manage tasks relating to call dialogue for the application server 150. In one arrangement, the dialogue server 170 can include web container 172 and EJB container 174. Moreover, the dialogue server 170 can include a voice markup interpreter EJB (Bean D).

The speech server 180 can handle one or more speech services for the application server 150. In one arrangement, the speech server 180 can include web container 182 and EJB container 184. Moreover, the speech server 180 can include an automatic speech recognition (ASR) EJB (Bean E) as well as a text-to-speech EJB (Bean F). Bean E and Bean F can be interface components, each of which interfaces with an identified speech engine 130. It should be appreciated by one of ordinary skill in the art that the telephone server 160, the dialogue server 170, and the speech server 180 can be arranged in a multitude of fashions and that the invention is not to be limited to the illustrative arrangement presented herein.

The system 100 can also include a media converter 125 and a resource connector 120. The media converter 125 can be a communication intermediary for streaming speech data configured to resolve protocol issues between the telephone gateway 115 and speech engines 130. Speech data can be streamed bi-directionally between the telephone gateway 115 and the speech engines 130 as appropriate.

The resource connector 120 can be a communication intermediary between the telephone gateway 115 and the application server 150 and/or media converter 125 that allocates resources for calls. In one embodiment, the resource connector 120 can normalize a telephony request into a request that is acceptable by the application server 150, thereby providing a generic means for the telephone gateway 115 to interface with the application server 150. For example, if the application server 150 communicates using HyperText Transfer Protocol (HTTP) messages, the resource connector 120 can convert a telephony request into an appropriate HTTP message. In another example, if the application server 150 utilizes a Session Initiation Protocol (SIP), the resource connector 120 can convert a telephony request into an appropriate SIP message.

The system 100 can further include one or more remote servers 140. Each remote server 140 can perform programmatic actions requiring functions inherent to the application server 150 using software interfaces G and H, which can be Java software objects. Software interfaces G and H can expose otherwise private functions and parameters to remote processes. For example, the software interfaces G and H can permit server 140 to access data objects within dynamic cache service, such as the dynacache included within WAS. In one embodiment, the software interface G can include a call control markup language and a voice markup language cache servlet. In another embodiment, the software interface H can include a grammar cache servlet. It should be noted that the software interfaces G and H can be disposed throughout the application server and need not be arranged as illustrated within FIG. 1. That is, each of the telephone server 160, the dialogue server 170, the speech server 180 can include one or more of the software interfaces G and/or H.

In operation, a user 105 can initiate a telephone call. The call can be conveyed through a telephone network 110, such as a Public Switched Telephone Network (PSTN), and can be received by the telephone gateway 115. The telephone gateway 115 can convey call information to the resource connector 120. For example, call information can be conveyed using a session initiation protocol (SIP). In particular embodiments, the telephone gateway 115 can also convert circuit-switched data to packet-switched data for processing by the resource connector 120, media converter 125, and application server 150. The resource connector 120 can generate a call descriptor object (CDO) that contains call related information, including the port(s) that telephone gateway 115 has assigned to the call. In one embodiment, the CDO can be a Java object and the assigned port(s) can include Reliable Data Protocol (RPT) port(s).

Once generated, the CDO can be sent to the media converter 125, which can establish one or more media ports that can be used for the call. Identifiers, which can be Uniform Resource Identifiers (URI), associated with the reserved media ports can be added to the CDO. The CDO can then be conveyed to various component servers within the application server 150 as needed, including the telephone server 160, the dialogue server 170, and the speech server 180. As the CDO is conveyed through component servers, additional information can be included within it. For example, a URI for a call control component within the telephone server 160 can be included within the CDO as the CDO is conveyed through the telephone server 160. Speech services can be triggered within the application server 150 as appropriate and provided for the call via the media converter 125 as needed in accordance with the details of the call being handled by the application server 150.

Figure 2:
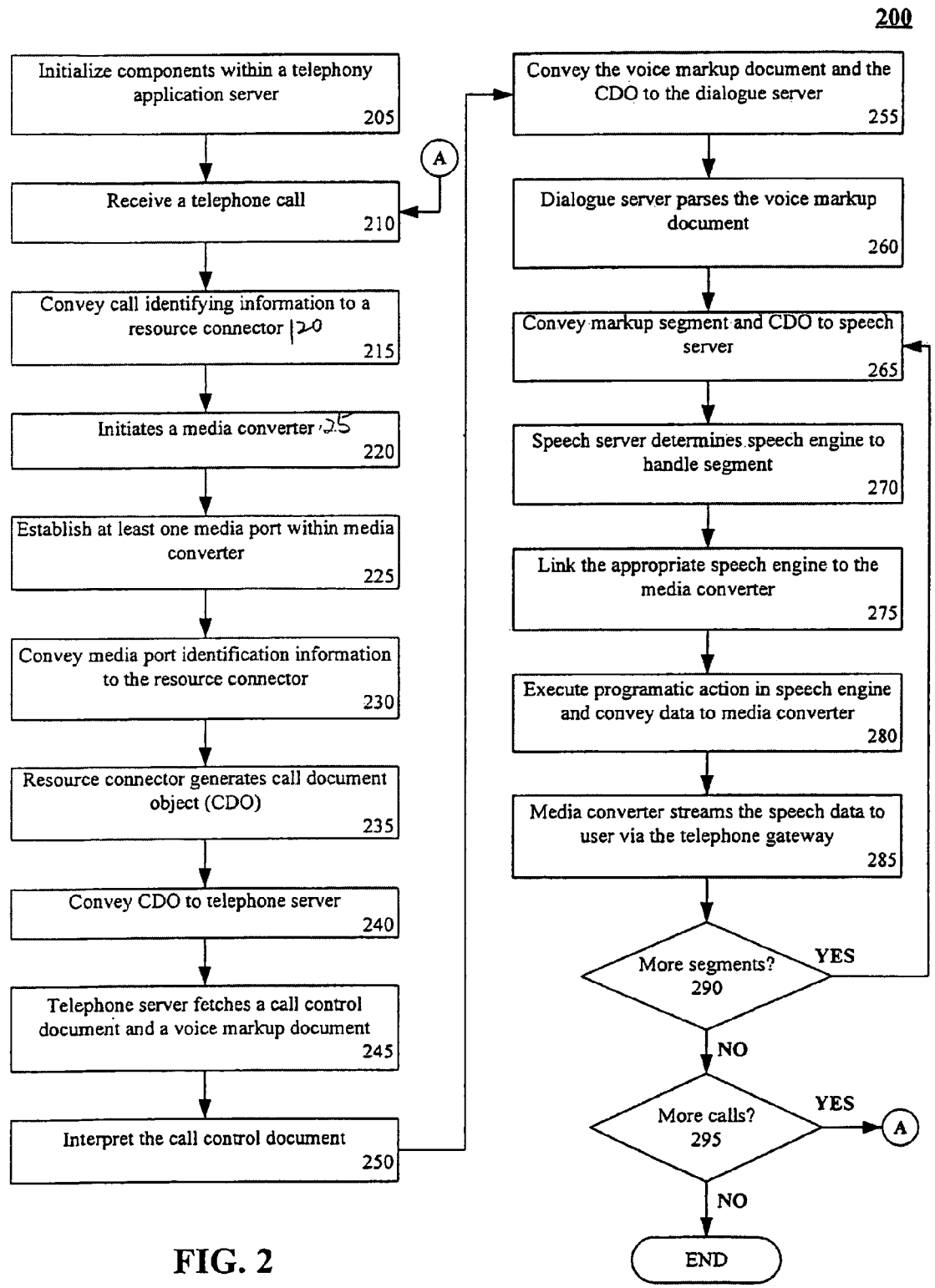
FIG. 2 is a flow chart illustrating a method for implementing telecommunication speech services in accordance with the inventive arrangements disclosed herein.

FIG. 2 is a method 200 for implementing telecommunication speech services in accordance with the inventive arrangements disclosed herein. The method 200 can be performed in the context of a telecommunications application server, such as a WAS. The method 200 can begin in step 205, where various telephony application server components can be initialized as appropriate. For example, a servlet within the telephony server component can activate a resource container that functions as a communication intermediary between a telephony gateway and the telephony application server. In another example, a speech server component can allocate a multitude of component interface objects, each interface object being associated with a particular speech engine. For example, a pool of stateless EJBs can be allocated within the speech server, each configured as an interface for a speech engine.

In step 210, a telephony gateway can receive a telephone call that requires at least one speech service. In step 215, call identifying information can be conveyed by telephone gateway to a resource connector. Call identifying information can include a call identifier, a caller telephone number, a called telephone number, a gateway port associated with the call, and so forth. In step 220, the resource connector can initiate a media converter for the call, where the media converter can serve as a communication intermediary between a speech engine and the telephone gateway. In step 225, the media converter can establish a connection with the calling port of the gateway and can establishes at least one media port for receiving speech data. In step 230, the media converter can convey identification information for the established media ports to the resource connector.

In step 235, the resource connector can generate a CDO that includes call identification and media port identification data. In step 240, the resource connector can convey the CDO to the telephone server component of the telephony application server.

In step 245, the telephone server can fetch a call control document and a voice markup document, where the call control document can be a Call Control Extensible Markup Language (CCXML) document and the voice markup document can be a Voice Extensible Markup Language (VoiceXML) document. Identifiers for these documents and/or interpreters for these documents can be added to the CDO. In step 250, the telephone server can manage call control functions by interpreting the call control document. In step 255, the voice markup document and the CDO can be conveyed to a dialogue server component of the telephony application server.

In step 260, the dialogue server can parse the voice markup document into a plurality of work segments called turns. In step 265, the CDO and a turn can be conveyed to a speech server component of the telephony application server. In step 270, the speech server can determine a speech engine to handle the turn. In step 275, the speech server can use the media port identifier within the CDO to link the selected speech engine to the identified media port of the media converter. In step 280, the speech engine can perform at least one programmatic action resulting in a speech output that can be conveyed to the media converter. In step 285, the media converter can stream synthetically generated speech to a calling party via the telephony gateway. The media converter can also receive speech from the calling party and convey it to an appropriate speech engine. In step 290, if there are more turns to process, the method can loop back to step 265, where the next turn can be conveyed to the speech server for processing.

If no more turns exist in step 290, the method can proceed to step 295, where the telephony application server can check to see if there are any more calls that need managed. If so, the method can branch to step 210, where the new telephone call can be received. Otherwise, the method can finish.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A telephony system with speech capabilities comprising:
    a telephone gateway communicatively linked to a telephone network;
    a telephone application server including a plurality of virtual machines, said virtual machines including a telephone server, a dialogue server, and a speech server;
    a resource connector that is a communication intermediary between said telephone gateway and said telephone application server, wherein call information is gathered by said resource connector and conveyed to the telephone application server; and
    a media converter that is a communication intermediary between said telephone gateway and said telephone application server, wherein the media converter is configured to stream speech signals between the telephone gateway and at least one speech engine.

2. The system of claim 1, wherein said telephone server is configured to fetch a call control markup document and a voice markup document for a call managed by the telephone application server.

3. The system of claim 1, wherein said dialogue server is configured to parse a voice markup document associated with a telephone call into a plurality of work units and to manage said work units for said telephone call.

4. The system of claim 3, wherein said speech server is configured to provide at least one speech service responsive to one of said work units conveyed to said speech server from said dialogue server.

5. The system of claim 4, wherein said at least one speech engine is remotely located from said telephone application server, said speech server comprising:
   at least one stateless, platform-independent, software interface component, the software interface component being associated with said remotely located speech engine.

6. The system of claim 1, said media converter comprising:
   at least one media port for streaming speech signals, wherein said media port is established at a time before an immediate need to stream speech signals has been identified.

7. The system of claim 1, said system further comprising:
   a call description object containing said call information, wherein said call description object is conveyed between said resource connector and said telephone application server and between virtual machines within said telephone application server.

8. The system of claim 7, said media converter comprising:
   at least one media port established responsive to a call being received by said telephone gateway, wherein an identifier for said media port is included within said call description object.

9. The system of claim 8, said telephone application server further comprising:
   at least one web server used to convey said call description object to at least one of said virtual machines.

10. The system of claim 1, wherein said telephone application server is a Websphere-type Application Server.

11. The system of claim 1, further comprising:
   means for normalizing a telephony request received by the telephone gateway into a request that is acceptable within an environment of the telephone application server.

* * * * *